UNITED STATES PATENT OFFICE.

EDWARD J. YETTER, OF DENVER, COLORADO.

COMPOSITION FOR ROOFING, PAVING, &c.

No. 820,162.    Specification of Letters Patent.    Patented May 8, 1906.

Application filed April 12, 1904. Serial No. 202,763.

*To all whom it may concern:*

Be it known that I, EDWARD J. YETTER, a citizen of the United States, residing at Denver, in the county of Denver and State of Colorado, have invented certain new and useful Improvements in Compositions for Roofing, Paving, &c.; and I do hereby declare the following to be a full, clear, and exact description of the invention, such as will enable others skilled in the art to which it appertains to make and use the same.

My invention relates to compositions of matter particularly adapted for use in preparing roofing-sheets, sheathing, paving, &c.; and its object is to produce at comparatively low cost a superior composition for such purposes, having among other notable qualities the valuable characteristics of crude wurtzilite or elaterite.

My composition consists of a soluble and fusible wurtzilite product combined in suitable proportions with lime sludge, together with a suitable oil or flux, if necessary, to which also may be added advantageously asphaltum or equivalent materials, either with or without oil, according to the nature of the substance added, as hereinafter explained. The elaterite or wurtzilite of this composition is a soluble and fusible conversion of the crude mineral. Such a soluble and fusible product is described in United States Letters Patent to Chas. E. Anthony, No. 620,082, dated February 21, 1899. This product, as pointed out in the specification of said patent, retains all the valuable characteristics of the crude material from which it is produced, but, unlike the crude intractible wurtzilite, is soluble in the ordinary solvents of caoutchouc and bitumen and is fusible under ordinary heating methods. In form, elasticity, hardness, color, and electric character the product corresponds closely with the crude mineral, but while the latter is ignitible and decomposes before reaching the fusion-point the product does not take fire, but when a flame is applied thereto simply melts. According to the Anthony process the product is obtained substantially as follows: A quantity of crude wurtzilite is placed in an air-tight vessel or retort and heated to about 600° Fahrenheit, with the effect in perhaps an hour's time of evolving a light gas, which in turn attacks the wurtzilite, first reducing it to a spongy mass and after several hours to a liquid state, in which it may be drawn off for use. The product which is drawn off from the retort may be immediately used in its hot liquid condition or partially cooled or solidified and worked in some suitable apparatus or completely cooled and hardened. I do not confine myself, however, to the use of this particular product obtained by the Anthony process should an elaterite of proper characteristics be produced by other methods.

Lime sludge is a substance found usually as a refuse product of sugar-factories, obtained in large quantities in the refining of beet-sugar. It is a calcined limestone which has taken up carbonic acid in the purifying process and is practically a carbonate of lime, which, however, has special physical characteristics particularly adapting it for this composition. This waste-product, known as "lime sludge" and sometimes pressed into "lime cakes" and called "lime mud," has no commercial value at the refineries and is therefore not saved by them, but is, on the contrary, a source of annoyance and expense to get rid of. It is thus a very inexpensive ingredient. It has a peculiarly strong affinity for hydrocarbons and readily combines chemically therewith when thoroughly pulverized and mixed.

A roofing composition containing elaterite and lime sludge as its chief ingredients possesses valuable properites, especially elasticity and pliability, combined with toughness and resistance to disintegration or deterioration. The lime sludge possesses greater mechanical and chemical advantages than pulverized limestone for mixing with the other ingredient or ingredients and, in addition, contains a percentage of foreign or vegetable matter, which is of great advantage to the hydrocarbon, strengthening the union of the lime and hydrocarbon. It also acts chemically on the elaterite, as well as with asphaltum when the latter is added, changing somewhat the condition of these ingredients, rendering them tougher and resistant to the ordinary causes of wear and disintegration. When lime sludge is used in large proportion, a very inexpensive composition is produced, which, however, is of great commercial value.

In forming the composition I mix crushed and thoroughly-pulverized lime sludge with melted or hot liquid elaterite, using also a suitable oil or flux, if necessary, to put the mixture in condition to work or spread readily. Various proportions of the ingredients may be adopted in accordance with the purpose in view. Any suitable oil may be used, as maltha, residuum of petroleum-oil, crude petroleum, some of the non-drying vegetable oils, as cotton-seed oil or linseed-oil, or any equivalent. Asphaltum is also found highly valuable, in combination with these ingredients, either with or without the oil, according to the nature of the asphaltum. Thus where hard asphaltum is used, such as the Trinidad variety, it is desirable to add an oil flux; but in using a soft asphaltum—such as the California, Texas, or other manufactured varieties, which naturally contain oil or have it incorporated in sufficient proportion by the refining process—oil as a distinct ingredient is not necessary. Any equivalent of asphaltum or substance of like nature may also be combined with the other ingredients named. For roofing and sheathing a suitable oil or flux is considered an essential ingredient unless asphaltum or equivalent material is used so tempered with oil that this substance may be omitted as a distinct ingredient.

To any of the compositions referred to, having elaterite and lime sludge as the chief ingredients, I may also add sand, litharge, infusorial earth, gravel, and other substances useful for roofing and paving compositions. I have found the following admixtures give excellent results: First, elaterite, fifty pounds; lime sludge, one hundred pounds. Second, elaterite, one hundred and fifty pounds; lime sludge, one hundred pounds; oil, one hundred and seventy-five pounds. Third, elaterite, one hundred pounds; asphaltum, seventy-five pounds; lime sludge, one hundred pounds; oil, one hundred and seventy-five pounds. The first of these admixtures gives a harder substance, adapted for roofing or paving-blocks, &c. The second and third are softer and more especially adapted for roofing compositions and coatings. They may be applied in liquid form for coating and saturating burlap, muslin, paper, and other fabrics for making roofing-sheets, floor-coverings, linings, and similar articles. These compositions are all very tough and durable. The proportions may, however, be varied as found desirable, either on account of the characteristics of the particular ingredients used, requiring different amounts to produce the desired effect and proper temper, or on account of the purpose for which the composition is designed, and hence it will be understood that I am not limited to any specific proportions.

The term "elaterite" as used in the following claims is intended to cover a material substantially as described herein, whether produced by a conversion of crude wurtzilite or by other methods; and includes any equivalent material or product known under the names of "elaterite" or "wurtzilite."

I claim as my invention and desire to secure by Letters Patent of the United States—

1. A composition of matter for purposes such as described having elaterite and lime sludge as chief ingredients combined in suitable proportions.

2. A composition of matter for purposes such as described containing elaterite, lime sludge, and a suitable oil or flux, combined in suitable proportions.

3. A composition of matter for purposes such as described containing elaterite, lime sludge, and asphaltum or an equivalent, with a suitable oil or flux either incorporated in the asphaltum or as a separate ingredient, combined in suitable proportions.

4. A composition of matter for purposes such as described containing elaterite and lime sludge as chief ingredients combined in proportions substantially as herein set forth.

In testimony whereof I affix my signature in presence of two witnesses.

EDWARD J. YETTER.

Witnesses:
MARY McCRUDDEN,
FRANK C. ERVIN.